US008526035B2

(12) United States Patent
Maeda (10) Patent No.: US 8,526,035 B2
(45) Date of Patent: Sep. 3, 2013

(54) PUSH-TYPE PULL PRINTING SYSTEM, PULL PRINTING METHOD, AND IMAGE FORMING APPARATUS (75) Inventor: Toshihiro Maeda, Sakai (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1098 days.

(21) Appl. No.: 11/984,205

(22) Filed: Nov. 14, 2007

(65) Prior Publication Data
US 2008/0209419 A1 Aug. 28, 2008

(30) Foreign Application Priority Data
Feb. 28, 2007 (JP) ................. 2007-049856

(51) Int. Cl.
G06F 3/12 (2006.01)
(52) U.S. Cl.
USPC ........................... 358/1.15; 709/203; 715/276
(58) Field of Classification Search
USPC .......................... 358/1.15; 709/203; 715/276
See application file for complete search history.

(56) References Cited

U.S. PATENT DOCUMENTS

| 5,617,518 | A | * | 4/1997 | Kuwamoto et al. | 358/1.15 |
| 6,757,070 | B1 | * | 6/2004 | Lin et al. | 358/1.1 |
| 7,528,978 | B2 | * | 5/2009 | Randt | 358/1.15 |
| 2001/0056449 | A1 | * | 12/2001 | Kawamoto et al. | 707/527 |
| 2002/0089689 | A1 | * | 7/2002 | Ferlitsch et al. | 358/1.15 |
| 2004/0125402 | A1 | * | 7/2004 | Kanai et al. | 358/1.15 |
| 2006/0279768 | A1 | * | 12/2006 | Wang et al. | 358/1.15 |

FOREIGN PATENT DOCUMENTS
JP 2004-220354 A 8/2004

* cited by examiner

Primary Examiner — Eric A Rust
(74) Attorney, Agent, or Firm — Buchanan Ingersoll & Rooney PC (57) ABSTRACT A push-type pull printing system comprising a server and an image forming apparatus, the server sending, to the image forming apparatus, a print job including print data and a print condition instruction command for the print data, and the image forming apparatus executing a print process based on the print job. Here, the image forming apparatus comprises an input receiver operable to receive an input of a print condition, a converter operable to convert the inputted print condition, before being transmitted to the server, to an instruction command in a description language interpretable by the image forming apparatus, and a transmitter operable to transmit the converted instruction command to the server; and the server comprises a job transmitter operable to receive the converted instruction command from and send the print job to the image forming apparatus, the print job including the instruction command as the print condition instruction command.

12 Claims, 10 Drawing Sheets

PRINT DATA SPECIFICATION SCREEN

| FILE NAME | DIRECTORY NAME |
|---|---|
| FILE1 | aaa/bbb/file1 |
| FILE2 | aaa/bbb/file2 |
| ..... | |
| ..... | |
| ..... | |
| ..... | |
| FILE50 | aaa/bbb/file50 |

FIG.6

PRINT CONDITION SETTING SCREEN

USER NAME : User1
NUMBER OF COPY : 5
PAPER FEED TRAY: AUTO
PRINT FORMAT: SINGLE-SIDED PRINTING
APPLICATION SETTING: NONE
USER AUTHENTICATION INFORMATION:
USER ID : 10034
PASSWORD : *****

FIG.7

```
<ESC>%-12345X@PJL
@PJL COMMENT PullPrint System
@PJL SET USERNAME="User 1"
@PJLSET QTY=5
@PJL SET MEDIASOURCE=AUTO
@PJL SET DUPLEX=OFF
@PJL SET PUNCH=OFF
@PJL SET USER ID="10034"
@PJL:***SECURE PASSWORD=12345
. . . . . . . . . . . . . . . .
. . . . . . . . . . . . . . . .
. . . . . . . . . . . . . . . .
. . . . . . . . . . . . . . . .
. . . . . . . . . . . . . . . .
. . . . . . . . . . . . . . . .
. . . . . . . . . . . . . . . .
```
1102

FIG.8

| 1001 | 1102 |
|---|---|
| PRINT DATA SPECIFICATION INFORMATION | SECOND PJL DESCRIPTION PRINT SETTING INFORMATION |

FIG.9

| 1102 | 2001 | 2002 |
|---|---|---|
| SECOND PJL DESCRIPTION PRINT SETTING INFORMATION | PJL DESCRIPTION PRINT MANAGEMENT INFORMATION | PDL DESCRIPTION PRINT DATA |

PUSH-TYPE PULL PRINTING SYSTEM, PULL PRINTING METHOD, AND IMAGE FORMING APPARATUS

This application is based on application No. 2007-049856 filed in Japan, the content of which is hereby incorporated by reference.

BACKGROUND OF THE INVENTION (1) Field of the Invention

This invention relates to a push-type pull printing system, in particular to a technology for controlling a content of a print process by issuing a print job.

(2) Description of the Related Art

In recent years, a pull printing system has come into use. The pull printing system includes an image forming apparatus called MFP (Multi-Function Peripheral) performing versatile functions such as copying, printing, and faxing, and a server providing print data for the image forming apparatus via a network such as a LAN.

There are two types of pull printing systems: a pull-type and push-type. In the pull-type, a print process is executed by sequentially performing the following sub processes: (a) the image forming apparatus issues a print job acquisition request to the server, (b) the server issues a print job to the image forming apparatus, and (c) the image forming apparatus acquires print data from a storage location specified by the print job issued by the server. On the other hand, in the push-type, a print process is executed by sequentially performing the following sub processes: (a) the image forming apparatus gives an instruction on print data and a print condition for the print data to the server, (b) the server issues a print job, based on the instruction, including the print data and an instruction command of the print condition for the print data, (c) the image forming apparatus receives the print job issued by the server.

Figure 14:
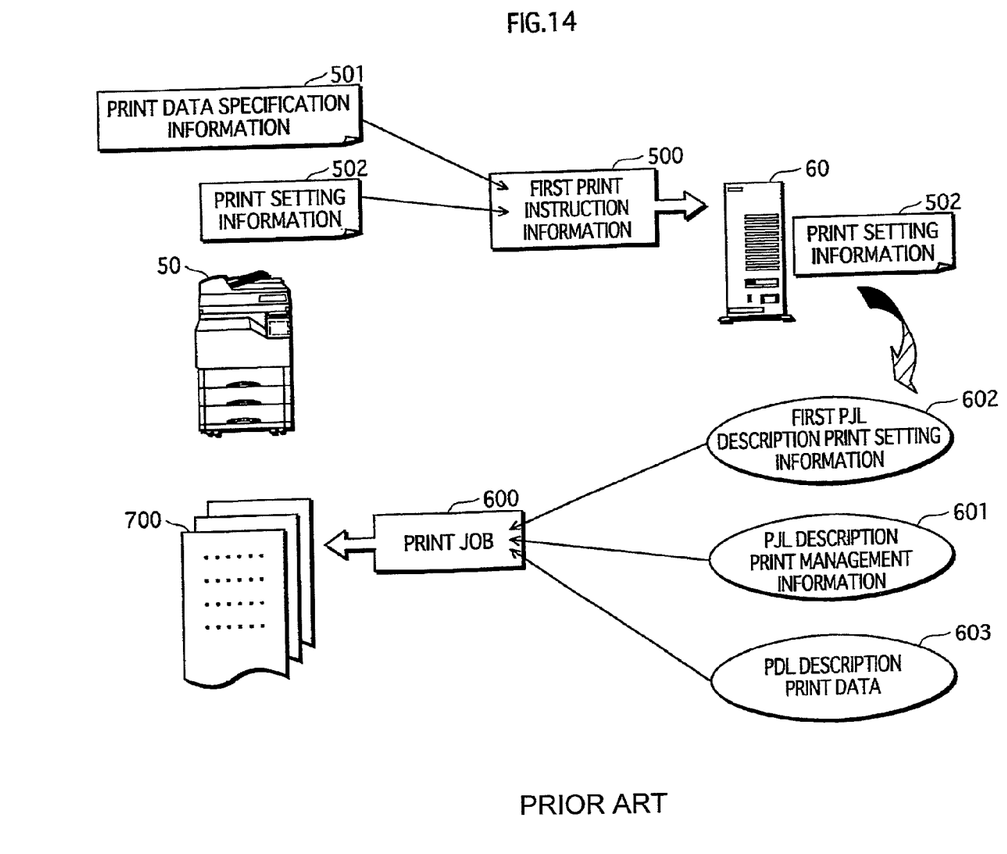
FIG. 14 is an image diagram showing a print process in a push-type pull printing system.

FIG. 14 is an image diagram showing a flow of the print process of the push-type pull printing system.

A reference numeral 50 in FIG. 14 indicates an image forming apparatus, 60 indicates a server, and 500 indicates a first print instruction information.

The first print instruction information 500 includes print data specification information 501 and print setting information 502, and is transmitted to the server 60 from the image forming apparatus 50 to give an instruction on a print target file and a print condition.

The print data specification information 501 includes a file name of the print target file requested to be printed and identification information of the image forming apparatus 50.

The print setting information 502 is information which indicates instructions relating to the print condition input by a user using the image forming apparatus 50. The instructions are such as a number of copies, specification of a sheet feeder, post-print process (stapling, punching, etc.), and print format (double-sided printing, single-sided printing, etc.).

A numeral reference 600 in FIG. 14 indicates a print job.

The print job 600 is issued by the server 60 in order to make the image forming apparatus 50 execute the print process, and includes first PJL (Printer Job Language) description print setting information 602, PJL description print management information 601, and PDL (Page Description Language) description print data 603.

Here, note that the PDL is a language for describing information regarding a page description, a drawing and the like for printing, and includes Post Script by Adobe Systems Incorporated, PCL (Page Control Language) by Hewlett Packard Company (US), RPCS (Refined Printing Command Stream) by Ricoh Co., Ltd.

Also, the PJL is a language developed by Hewlett Packard Company (US) for controlling a print device.

The server 60 creates the first PJL description print setting information 602 by converting the description language of the print setting information 502 into PJL commands which are interpretable for the print device of the image forming apparatus 50.

The PJL description print management information 601 is information which is created by the server 60 to manage print jobs and described in the PJL. Specifically, an identifier of the print job and identification information of the image forming apparatus to which the print job is outputted are included in this information.

The PDL description print data 603 indicates data content of the print target file. The server 60 creates the PDL description print data 603 by converting the data format of the print target file into a PDL data format which is interpretable for the print device of the image forming apparatus 50.

In the above-mentioned push-type pull printing system, the printing is performed by taking following steps: (1) the first print instruction information 500 is transmitted from the image forming apparatus 50 to the server 60, (2) the server 60 issues the print job 600 upon converting description languages of the data of the print target file and an instruction of the print condition thereof into description languages (PJL, PDL), which are interpretable for the print device of the image forming apparatus 50, and (3) the image forming apparatus 50 executes a print process 700 in accordance with the issued print job 600.

As mentioned above, in the push-type pull printing system, the print job is issued by the server upon converting the description languages of the print job into languages which are interpretable for the print device of the image forming apparatus. Consequently, even in a case where an image forming apparatus of a different type or manufacturer is used, it is not necessary to install multiple interpreters to each image forming apparatus according to the type of the data format of the print target file which has been converted into the PDL. Thus, the print process can be executed easily based on the print job transmitted from the server.

Moreover, when a trouble occurs in the print process, the server can reissue the print job, allowing easy reprinting.

Also, the print process can be executed using an ordinary printing protocol (e.g. LPR (Line Printer Daemon Protocol)), thus reducing a workload of controlling communication at the image forming apparatus side.

However, because PJL data is of a relatively simple ASCII (American Standard Code for Information Interchange) format, a considerable number of manufacturers have created unique commands, using these additional commands as execution commands for various printing functions. As a result, every time an image forming apparatus using uniquely-created PJL commands is newly added to a push-type pull printing system, the uniquely created additional PJL commands corresponding to an instruction of a new print condition need to be newly registered to the server. Otherwise, it is likely to have trouble in a conversion process of the description language of the instruction of the print condition when issuing the print job. Accordingly, the print job issuing function of the server requires additional maintenance effort.

Further, when the additional registration of the PJL commands is omitted, part of the print function instructed by the print condition set at the image forming apparatus may not be executed.

SUMMARY OF THE INVENTION

The present invention was conceived in view of the above problems, and aims to provide a push-type pull printing system, a pull printing method, and an image forming apparatus which enable an easy maintenance of the print job issuing function and proper execution of the instruction of the print condition set at the image forming apparatus even if an image forming apparatus is newly added to the push-type pull printing system.

In order to achieve the above object, the present invention provides a push-type pull printing system comprising a server and an image forming apparatus, the server sending, to the image forming apparatus, a print job including print data and a print condition instruction command for the print data, and the image forming apparatus executing a print process based on the print job, the image forming apparatus comprising: an input receiver operable to receive an input of a print condition; a converter operable to convert the inputted print condition, before being transmitted to the server, to an instruction command whose description language is interpretable by the image forming apparatus; and a transmitter operable to transmit the converted instruction command to the server, and the server comprising: a job transmitter operable to receive, from the image forming apparatus, the converted instruction command, and to send, to the image forming apparatus, the print job including therein the received converted instruction command as the print condition instruction command.

The present invention also provides an image forming apparatus in a push-type pull printing system, executing a print process based on a print job that is sent by a server and includes print data and a print condition instruction command for the print data, the image forming apparatus comprising: an input receiver operable to receive an input of the print condition; a converter operable to convert the inputted print condition, before being transmitted to the server, to an instruction command whose description language is interpretable by the image forming apparatus; and a transmitter operable to transmit the converted instruction command to the server.

In each of the above configuration, a description language of the print condition instruction command may be a printer job language (PJL) and a description language of the print data may be a page description language (PDL).

The present invention also provides a pull printing method used in a push-type pull printing system comprising a server and an image forming apparatus, the server sending, to the image forming apparatus, a print job including print data and a print condition instruction command for the print data, and the image forming apparatus executing a print process based on the print job, the pull printing method comprising the steps of: causing the image forming apparatus to i) receive an input of the print condition, ii) convert the inputted print condition, before being transmitted to the server, to an instruction command whose description language is interpretable by the image forming apparatus, and iii) transmit the converted instruction command to the server; and causing the server to receive, from the image forming apparatus, the converted instruction command, and to send, to the image forming apparatus, the print job including therein the received converted instruction command as the print condition instruction command.

In the present invention with the above configuration, the server side does not need to perform a conversion process to convert the instruction of the print condition to the instruction command interpretable by the image forming apparatus. Thus, in a case where an image forming apparatus including an instruction uniquely set by a manufacturer in order for the image forming apparatus to execute a particular print condition is newly added to a push-type pull printing system, an instruction command for the image forming apparatus to execute the particular print condition, which corresponds to the instruction of the particular print condition, does not need to be additionally registered to the server side. This allows an easy maintenance of the print job issuing function on the server side, and, at the same time, ensures smooth execution of the print condition by the image forming apparatus even when the print condition includes use of the uniquely-set command.

Here, in the above configuration, the following may be implemented. The inputted print condition includes user authentication information, the user authentication information is encrypted before being converted to the instruction command and transmitted to the server, and the image forming apparatus further comprises: a decrypter operable to acquire the encrypted user authentication information by interpreting the print job and decrypt the acquired encrypted user authentication information; a verifier operable to perform a verification of the decrypted user authentication information; and a printer operable to execute the print process if the verification is successful.

Consequently, even when the push-type pull printing system includes an image forming apparatus having an authentication print function that requires authentication of a user before executing a print process, the user authentication information encrypted by the image forming apparatus is converted to a description language interpretable by the image forming apparatus, and the converted user authentication information can be directly included in the print job issued by the server without change. Thus, the server side can execute the authentication print function without performing additional processes for encrypting and decrypting the user authentication information. Also, since the user authentication information has been encrypted when being transmitted to/from the server, a leakage of the user authentication information can be prevented.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings.

DESCRIPTION OF PREFERRED EMBODIMENTS

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

The best modes for implementing the present invention are described next with reference to drawings.

<Structure>

(Push-Type Pull Printing System 100)

Figure 1:
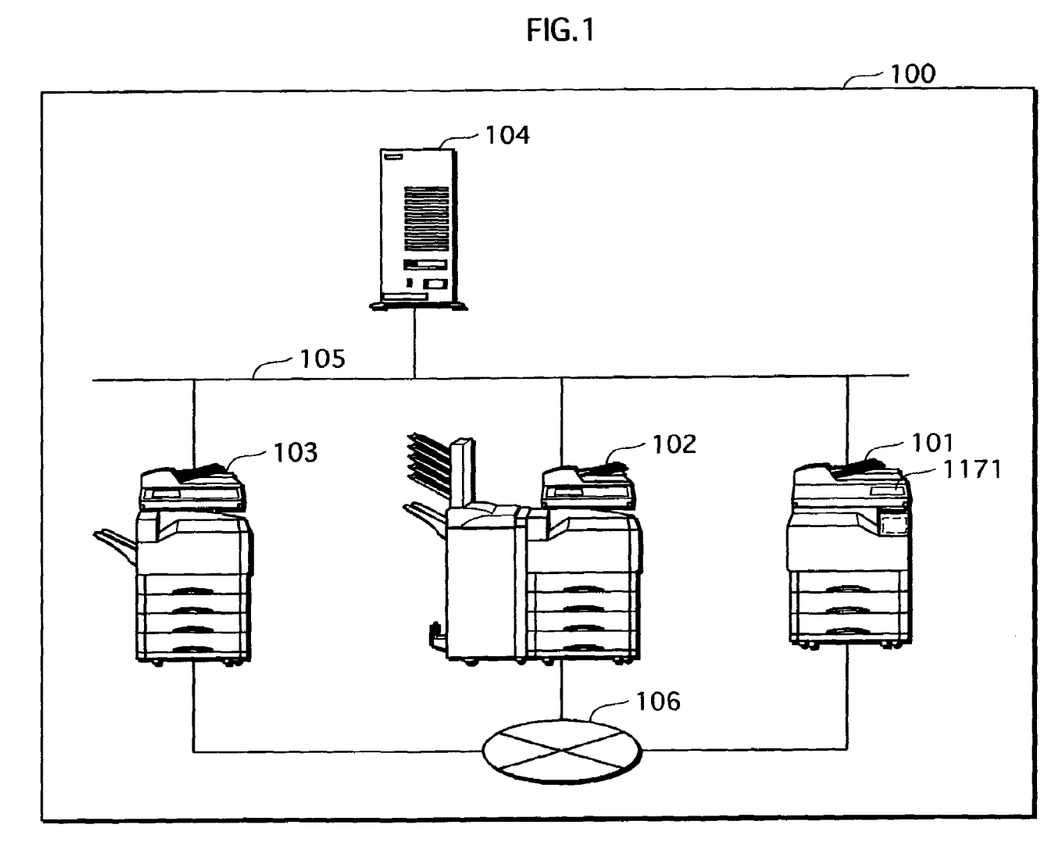
FIG. 1 shows a structure of a push-type pull printing system 100.

FIG. 1 shows a structure of a push-type pull printing system 100.

The push-type pull printing system 100 includes image forming apparatuses 101 to 103 and a server 104.

Each image forming apparatus and the server 104 are connected to each other by a LAN (Local Area Network) 105.

Also, each image forming apparatus is connected to a communication network 106 constituted of a telephone line and the like to construct a network such that the image forming apparatus can fax via the communication network 106.

(Image Forming Apparatuses 101, 102, 103)

(Hardware Structure)

The image forming apparatuses 101, 102 and 103 of the present embodiment include a microprocessor, a ROM, a RAM, a hard disk unit, an operation panel (a touch panel or a panel including multiple keys for input, a liquid crystal display and the like), a scanner, a printer including an image printer such as a laser printer, a facsimile and the like. A computer program is stored in the above-mentioned RAM or hard disk unit. The image forming apparatuses 101 to 103 achieve respective functions, which will be described in the following function structure, as a result of the microprocessor operating in accordance with the computer program. Here, the computer program is made of a combination of multiple command codes giving instructions to the computer in order to achieve a predetermined function.

(Function Structure)

The image forming apparatuses 101, 102, and 103 have resembling function structures. Therefore, the function structure of the image forming apparatus 101 will be described as an example in the following.

Figure 2:
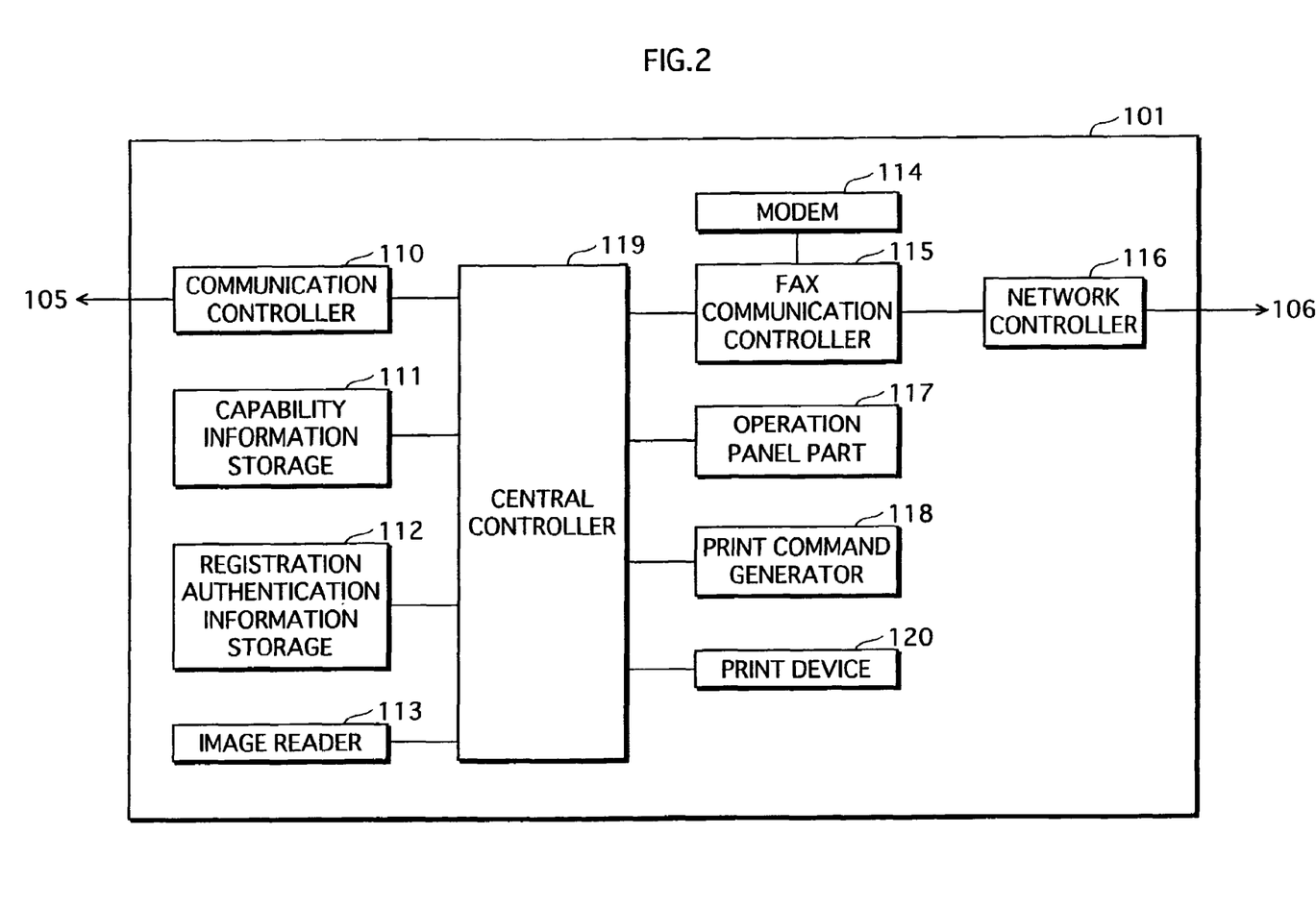
FIG. 2 is a functional block diagram showing a function structure of an image forming apparatus 101.

FIG. 2 is a functional block diagram showing a function structure of an image forming apparatus 101. As shown in FIG. 2, the image forming apparatus 101 includes a communication controller 110, a capability information storage 111, a registration authentication information storage 112, an image reader 113, a modem 114, a FAX communication controller 115, a network controller 116, an operation panel part 117, a print command generator 118, a central controller 119, and a print device 120.

(Communication Controller 110)

The communication controller 110 is an interface used for connecting to the LAN 105, and controls the communication with the image forming apparatuses 102 and 103 and the server 104 connected to the LAN 105. The above-mentioned communication control is performed using a predetermined protocol such as TCP (Transmission Control Protocol)/IP (Internet Protocol), LPR, RAW, IPP (Internet Printing Protocol).

(Capability Information Storage 111)

The capability information storage 111 stores identification information of the image forming apparatus 101, a PDL data format interpretable at the image forming apparatus 101, and information regarding a printing protocol applicable to the image forming apparatus 101.

(Registration Authentication Information Storage 112)

The registration authentication information storage 112 stores registration authentication information of each user pre-registered as an authorized user of the image forming apparatus 101 and an encryption key of a common key system for encrypting and decrypting user authentication information, which will be described later.

It should be noted here that the "registration authentication information" is composed of a user ID of the above-mentioned each authorized user and a password.

(Image Reader 113)

The image reader 113 includes an image input device such as a scanner, and, with a built-in light source, irradiates light on an image of letters, a drawing, table or photo recorded on a paper document. The image reader 113 forms a reflected image on a solid-state sensing device using a lens and converts the formed image into an image signal via the solid-state sensing device, generating image data as a result.

(Modem 114)

The Modem 114 is used to modulate transmitting signals transmitted to and demodulate receiving signals received from an outside image forming apparatus, a communication counterpart, via the communication network 106.

(FAX Communication Controller 115)

The FAX communication controller 115, via the modem 114, modulates transmitting signals transmitted to and demodulates receiving signals received from an image forming apparatus, a communication counterpart.

Also, the Fax communication controller 115 is connected to the communication network 106 via the network controller 116 and communicates with an image forming apparatus, a communication counterpart.

(Network Controller 116)

The network controller 116 is used to connect to the communication network 106.

(Operation Panel Part 117)

The operation panel part 117 includes multiple input keys and a display part (e.g. liquid crystal display) 1171 in FIG. 1, and a touch panel is mounted on a surface of the display part 1171. After the user inputs an instruction by touch input from the touch panel or by key input from the input keys, the operation panel part 117 notifies the central controller 119 of the inputted instruction.

The operation panel part 117 displays a GUI (Graphic User Interface) display screen (hereinafter, referred to as "print data specification screen") on the display part 1171 to receive a specification of the print data. The display of the GUI display screen is based on file list information which has been acquired from the server 104 and shows a correspondence of file names and directory names of the print target files.

Figure 5:
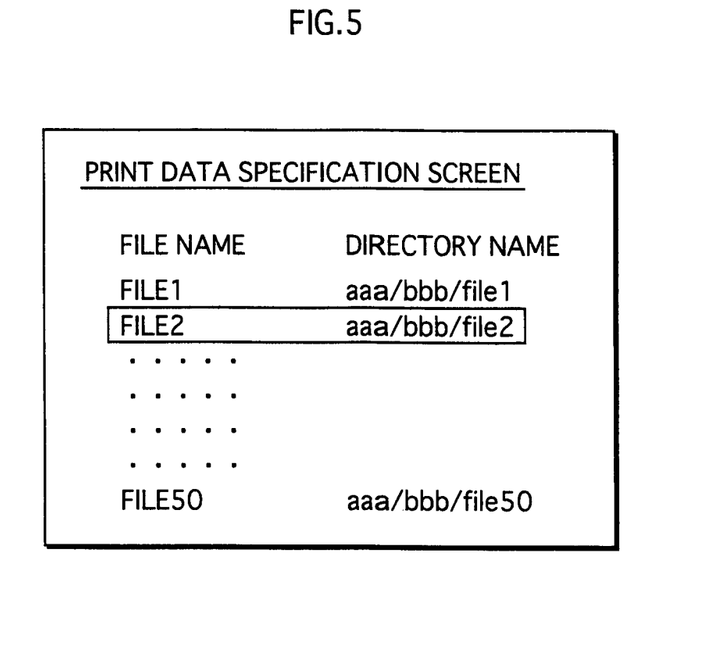
FIG. 5 shows a specific example of a print data specification screen.

FIG. 5 shows a specific example of a print data specification screen. In FIG. 5, files 1 to 50 are displayed as print target files along with the directory names, and the print data specification screen indicates that the file 2 enclosed in a rectangular box has been specified.

Also, the operation panel part 117, during a second instruction information transmitting process which will be described later, displays a GUI display screen (hereinafter, referred to as "print condition setting screen") on a display part 1171 to receive a print-condition setting input.

Figure 6:
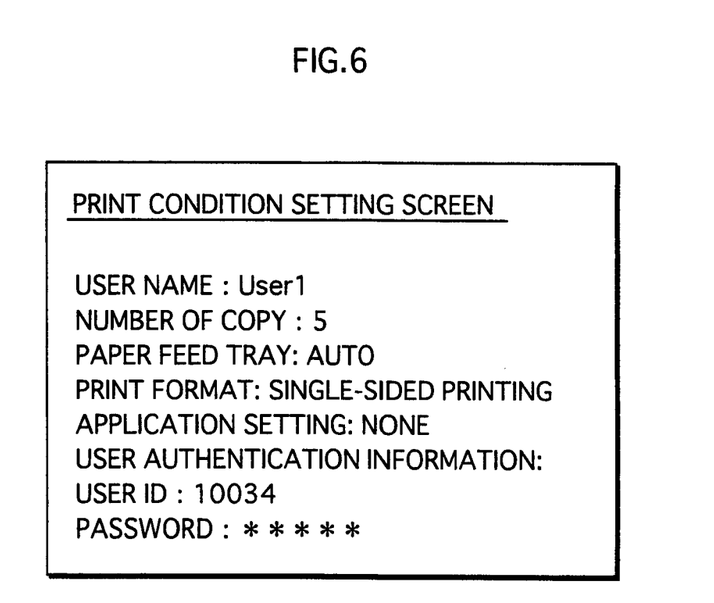
FIG. 6 shows a specific example of a print condition setting screen.

FIG. 6 shows a specific example of a print condition setting screen. The print condition in FIG. 6 indicates settings such as a user name, a number of copies, a paper feed tray, a print format, and user authentication information composed of a user ID and a password.

(Print Command Generator 118)

The print command generator 118 converts a description language of the input or default print setting information inputted from the central controller 119 into PJL commands, thereby generating the second PJL description print setting information, and outputs it to the central controller 119.

Figure 7:
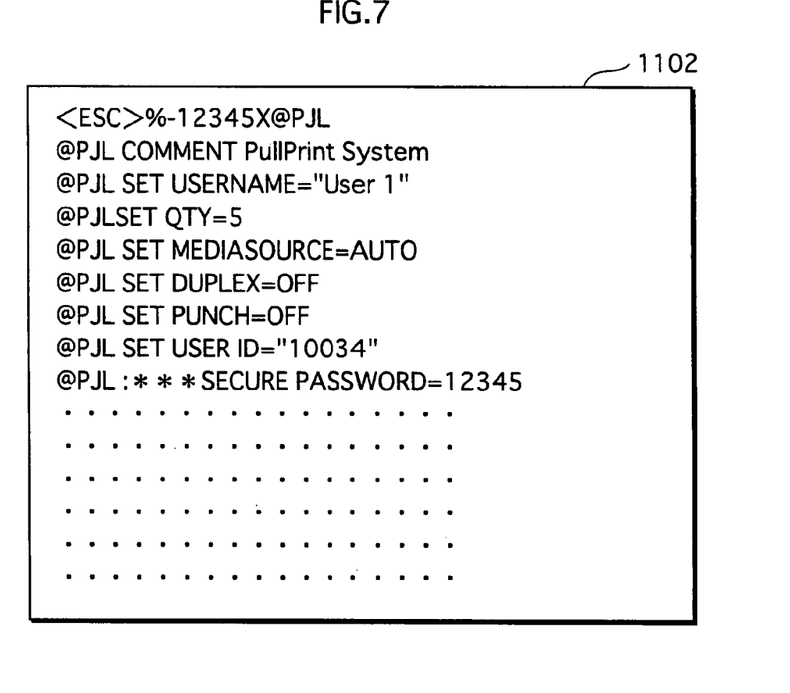
FIG. 7 shows a specific example of second PJL description print setting information.

FIG. 7 shows a specific example of second PJL description print setting information. The second PJL description print setting information shown in FIG. 7 has been generated by converting, into the PJL commands, the description language of the input print setting information set on the print condition setting screen in FIG. 6. For example, "@PJL SET USERNAME="User 1"" is a PJL command converted from a setting "USER NAME: User 1" in FIG. 6. Likewise, "@PJL SET QTY=5" is a PJL command converted from a setting "NUMBER OF COPY: 5" in FIG. 6.

(Central Controller 119)

The central controller 119 performs an overall control on the image forming apparatus 101, a generation process of the second print instruction information, an acquisition process of a print job, and an acquisition process of registration authentication information.

(Generation Process of Second Print Instruction Information)

After a user specifies a print target file name via the print data specification screen, the central controller 119 acquires identification information of the image forming apparatus 101 from the capability information storage 111 and generates print data specification information including the acquired identification information and the name of the specified print target file.

Next, after the user completes an input for setting the print condition from the print condition setting screen, the central controller 119 outputs to the print command generator 118 the information indicating the print condition specified by the user input (hereinafter, referred to as "input print setting information"). The print command generator 118 converts the description language of the input print setting information into the PJL commands, thus generating the second PJL description print setting information.

Note that in a case where there is no setting input made on the above-mentioned print condition setting screen, the central controller 119 outputs to the print command generator 118 information indicating the preset default print condition (hereinafter, referred to as "default print setting information"), and the print command generator 118 converts the description language of the default print setting information to the PJL commands to generate the second PJL description print setting information.

Also, when the input of user authentication information is included in the print condition, the central controller 119 encrypts the user authentication information using an encryption key stored in the registration authentication information storage 112 and outputs the encrypted user authentication information to the print command generator 118.

Next, after the second PJL description print setting information is inputted from the print command generator 118, the central controller 119 generates the second print instruction information including the generated print data specification information and the input second PJL description print setting information, and transmits the generated second print instruction information to the server 104 via the communication controller 110.

Figure 8:
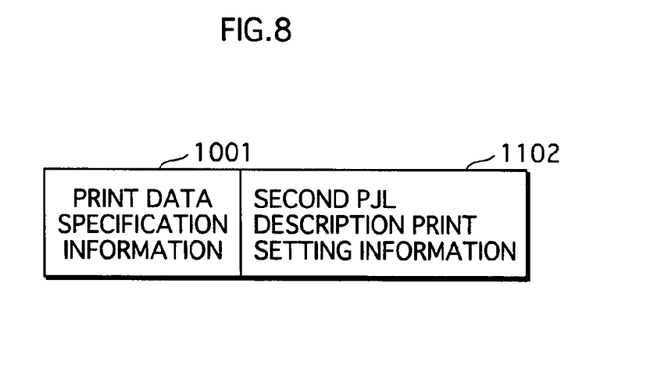
FIG. 8 shows a specific example of second print instruction information.

FIG. 8 shows a specific example of second print instruction information.

(Print Job Acquisition Process)

After the print job issued by the server 104 is received by the communication controller 110, the central controller 119 acquires the received print job from the communication controller 110 and outputs the acquired print job to the print device 120.

Here, the "print job" includes the same information as the print job 600 described in the Background Art section, except that the second PJL description print setting information is included therein instead of the first PJL description print setting information.

(Registration Authentication Information Acquisition Process)

The central controller 119 acquires, from the registration authentication information storage 112, registration authentication information of the corresponding user ID and an encryption key in response to a request from the print device 120 and outputs them to the print device 120.

(Print Device 120)

Figure 3:
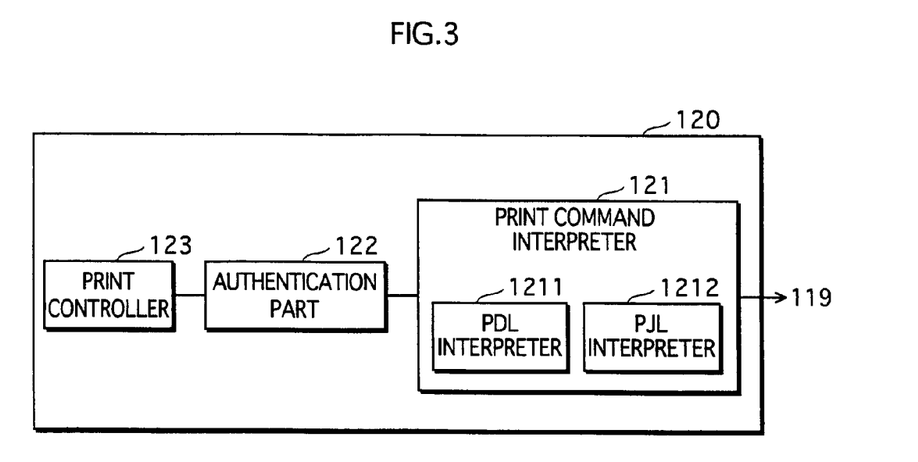
FIG. 3 is a functional block diagram showing a function structure of a print device 120.

FIG. 3 is a functional block diagram showing a function structure of a print device 120.

The print device 120 includes a print command interpreter 121, an authentication part 122, and a print controller 123.

(Print Command Interpreter 121)

The print command interpreter 121 includes a PDL interpreter 1211 and a PJL interpreter 1212.

((PDL Interpreter 1211))

The PDL interpreter 1211 acquires PDL description print data from the print job inputted from the central controller 119, interprets the acquired data using an interpreter for the PDL, and outputs the interpretation result to the authentication part 122.

It should be noted here that the PDL description print data includes the same information as the PDL description print data 603 described in the Background Art section, and is created by the server 104 converting the data format of the print target file into a PDL data format which is interpretable for the print device of the image forming apparatus 101.

((PJL Interpreter 1212))

The PJL interpreter 1212 acquires the PJL description print management information and the second PJL description print setting information from the print job inputted from the central controller 119, interprets the acquired information using an interpreter for the PJL, and outputs the interpretation result to the authentication part 122.

(Authentication Part 122)

The authentication part 122 acquires the encrypted user authentication information based on the interpretation result of the second PJL description print setting information inputted from the PJL interpreter 1212, and decrypts the acquired user authentication information with use of the encryption key stored in the registration authentication information storage 112.

Furthermore, the authentication part 122 acquires each registration authentication information corresponding to the user ID, which is stored in the registration authentication information storage 112 via the central controller 119 and performs an authentication process of the user authentication information by verifying the decrypted user authentication information against the acquired registration authentication information.

During the above authentication process, i) if the verification succeeds, the authentication part 122 outputs to the print controller 123 the interpreted result inputted from the print command interpreter 121, and ii) if the verification fails, the execution of the print process is terminated without outputting the interpreted result to the print controller 123.

(Print Controller 123)

After the interpreted result is inputted from the authentication part 122, the print controller 123 rasterizes the print data interpreted by the PDL interpreter 1211 and performs a print process to print an image on recording paper based on the rasterized image data in accordance with the print condition interpreted by the PJL interpreter 1212.

(Server 104)

(Hardware Configuration)

The server 104 of the present embodiment includes a microprocessor, a ROM, a RAM, a hard disk unit, a keyboard for inputting instructions, a mouse, a display unit composed of a liquid crystal display, a CRT, etc. and the like. A computer program is stored in the RAM or hard disk unit. The server 104 achieves each function mentioned in the following descriptions of function structures as a result of the microprocessor operating in accordance with the computer program.

5(Function Structure)

Figure 4:
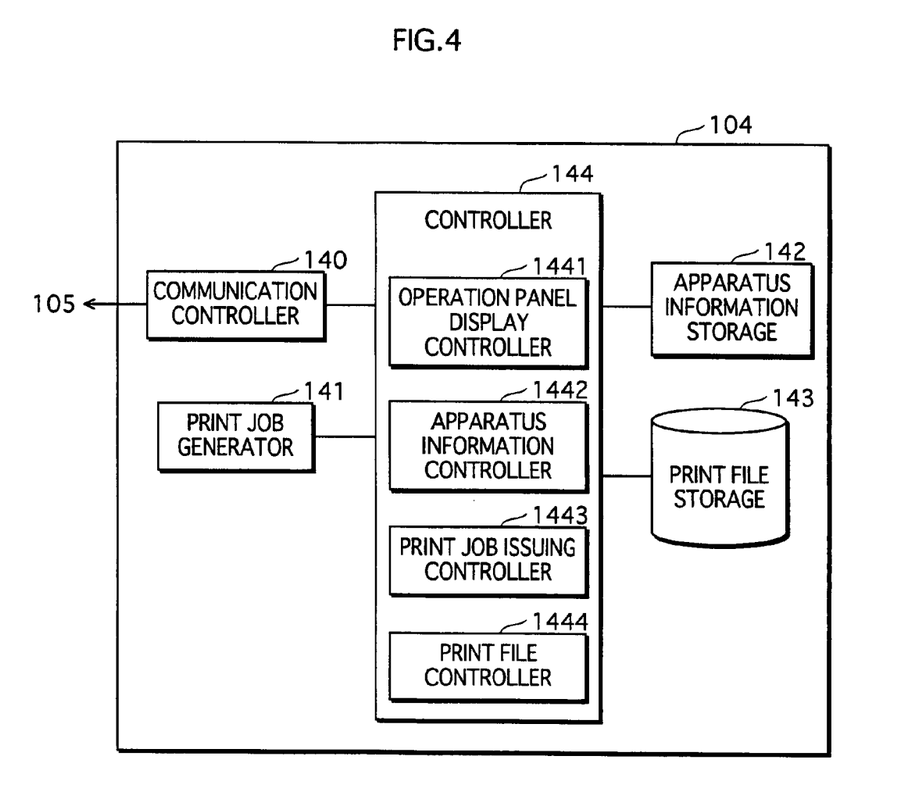
FIG. 4 is a functional block diagram showing a function structure of a server 104.

FIG. 4 is a functional block diagram showing a function structure of a server 104.

The server 104 includes a communication controller 140, a print job generator 141, an apparatus information storage 142, a print file storage 143, and a controller 144.

(Communication Controller 140)

The communication controller 140 is an interface used to connect to the LAN 105, and controls communication between the server 104 and the image forming apparatuses 101, 102, and 103 connected to the LAN 105. The abovementioned communication control is performed using a predetermined protocol such as TCP/IP, LPR, RAW, or IPP.

(Apparatus Information Storage 142)

The apparatus information storage 142 stores information relating to network addresses of the respective image forming apparatuses (image forming apparatuses 101 to 103) in the push-type pull printing system 100, PDL data formats which are interpretable by the respective image forming apparatuses, and the printing protocols which are applicable to the respective image forming apparatuses.

(Print File Storage 143)

The print file storage 143 stores multiple print target files and file list information indicating correspondence between file names and directory names of the print target files.

(Controller 144)

The controller 144 includes an operation panel display controller 1441, an apparatus information controller 1442, a print job issuing controller 1443, and a print file controller 1444.

(Operation Panel Display Controller 1441)

The operation panel display controller 1441 reads out the file list information stored in the print file storage 143 in response to an acquisition request therefor from the image forming apparatus 101. The operation panel display controller 1441 then transmits the read-out file list information to the image forming apparatus 101 via the communication controller 140.

(Apparatus Information Controller 1442)

The apparatus information controller 1442 communicates with respective image forming apparatuses connected to LAN 105 via the communication controller 140, acquires information stored in the capability information storage 111 from the respective image forming apparatuses, and stores the acquired information in the apparatus information storage 142. The above process is performed periodically, updating the information.

(Print Job Issuing Controller 1443)

After receiving the second print instruction information transmitted from an image forming apparatus (e.g. image forming apparatus 101) connected to the LAN 105 via the communication controller 140, the print job issuing controller 1443 acquires the second PJL description print setting information and the print data specification information from the received second print instruction information. The print job issuing controller 1443 then notifies the print file controller 1444 of the name of the print target file indicated by the print data specification information and acquires the print target file corresponding to the name of the print target file from the print file controller 1444. After that, the print job issuing controller 1443 notifies the apparatus information controller 1442 of the identification information of the image forming apparatus indicated by the print data specification information and acquires, from the apparatus information controller 1442, information regarding a PDL data format (hereinafter, referred to as "PDL data format information") interpretable by the image forming apparatus.

Next, the print job issuing controller 1443 creates an identification number for the print job and generates print management information including the identification number of the print job and the identification number of the image forming apparatus indicated by the print data specification information.

The print job issuing controller 1443 then requests a generation of a print job at the print job generator 141 by outputting thereto the acquired second PJL description print setting information, print target file, and PDL data format information and the generated print management information. Following that, the print job issuing controller 1443 acquires the generated print job from the print job generator 141 and transmits the print job, via the communication controller 140, to the image forming apparatus (here, the image forming apparatus 101) which is the transmission source of the second print instruction information.

Also, the print job issuing controller 1443 temporarily retains the acquired print job and deletes the aforementioned print job upon receiving a notification of completion of the print job, transmitted, via the communication controller 140, from the image forming apparatus (here, image forming apparatus 101) to which the print job has been transmitted.

(Print File Controller 1444)

The print file controller 1444 manages recording/reading-out of the print target file into/from the print file storage 143. The recording of the-print target file is performed, for example, by the print file controller 1444 receiving the print target file transmitted from a PC (Personal Computer, not shown) connected to the LAN 105 via the communication controller 140 and storing the print target file into the print file storage 143.

Also, the reading out of the print target file is performed in response to a request from the print job issuing controller 1443.

(Print Job Generator 141)

The print job generator 141 has a plurality of printer drivers corresponding to the data formats indicated by the PDL data format information of the respective image forming apparatuses connected to the LAN 105, and performs a print data format conversion process, a print management information data format conversion process, and a print job generating process.

(Print Data Format Conversion Process)

Upon receiving an input of the print target file and the PDL data format information of the image forming apparatus (here, image forming apparatus 101), for which a print job is to be issued, from the print job issuing controller 1443, the print job generator 141 uses a printer driver corresponding to the data format indicated by the PDL data format information to convert the data format of the inputted print target file and generates PDL description print data.

(Print Management Information Data Format Conversion Process)

The print job generator 141 converts the description language of the print management information inputted from the print job issuing controller 1443 into PJL, generating the PJL description print management information.

(Print Job Generation Process)

The print job generator 141 generates a print job from the PDL description print data generated by the print data format conversion process, the PJL description print management information generated by the print management information data format conversion process, and the second PJL description print setting information transmitted from the image forming apparatus (here, image forming apparatus 101) and then inputted from the print job issuing controller 1443.

Figure 9:
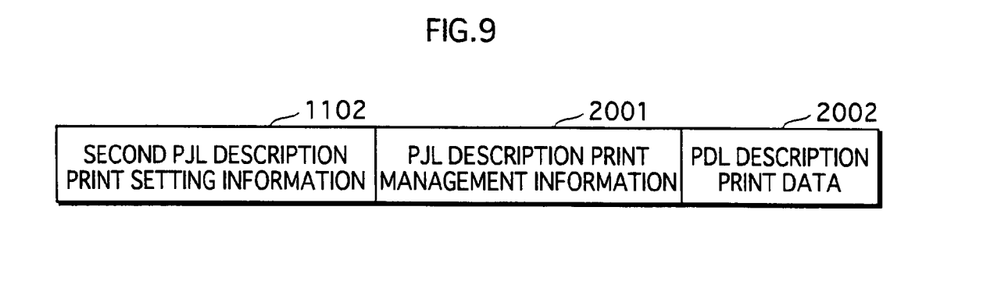
FIG. 9 shows a specific example of a print job generated by a print job generator 141.

FIG. 9 shows a specific example of a print job generated by a print job generator 141.

<Operation>

(Second Print Instruction Information Transmission Process)

Figure 11:
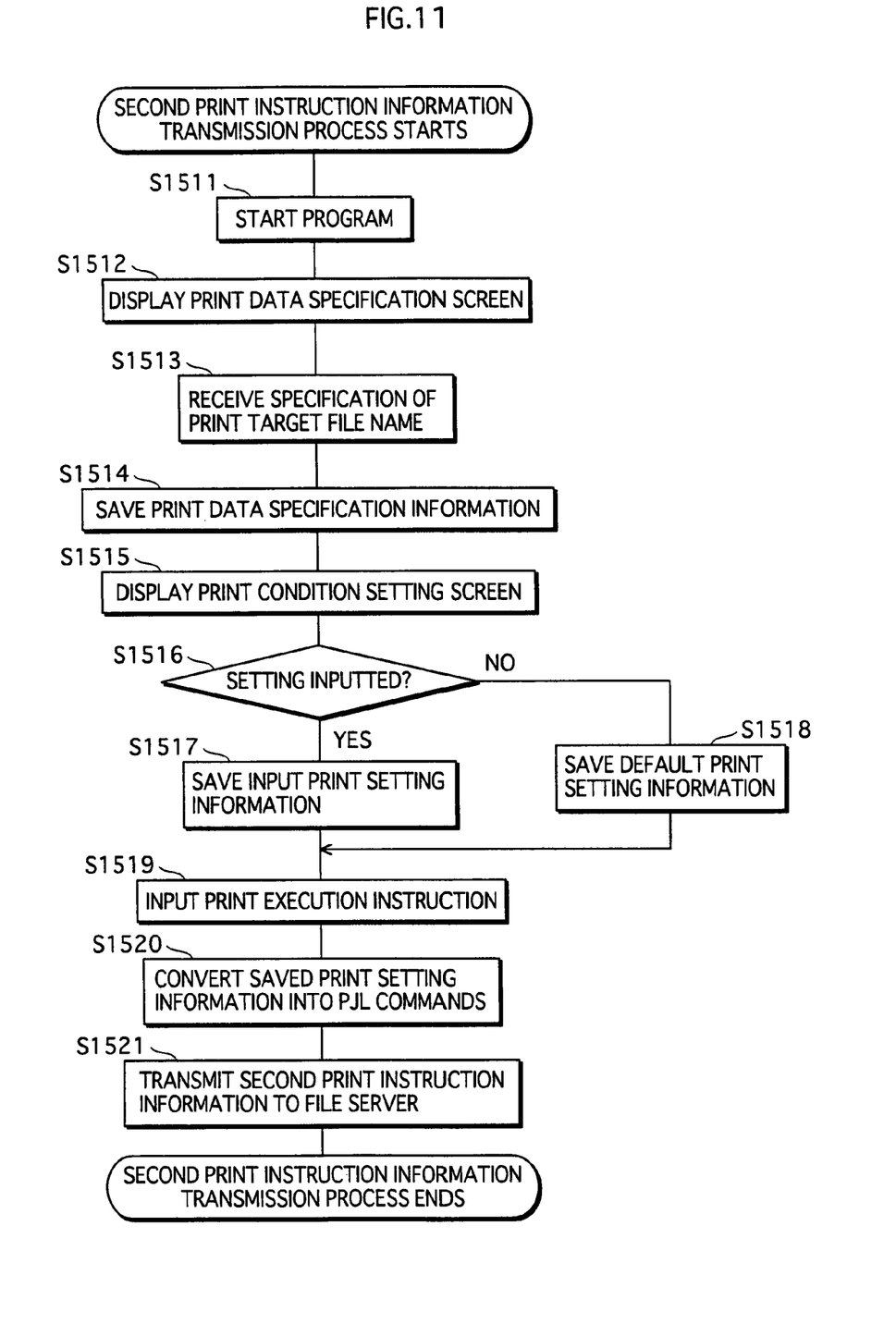
FIG. 11 is a flowchart showing a transmission process of the second print instruction information performed by the image forming apparatus 101.

FIG. 11 is a flowchart showing a transmission process of the second print instruction information performed by the image forming apparatus 101.

Described next is the above-mentioned operation with reference to FIG. 11. Note that the image forming apparatuses 102 and 103 operate in a similar way to the image forming apparatus 101.

An execution instruction of the second print instruction information transmission process inputted by a user via the operation panel part 117 triggers the central controller 119 to start up a computer program related to the process (step S1511), acquire file list information from the server 104 via the communication controller 110, and display the print data specification screen on the display part 1171 of the operation panel part 117 based on the file list information (step S1512).

Next, after the print target file name is specified by the user via the displayed print data specification screen (step S1513), the central controller 119 i) acquires identification information of the image forming apparatus 101 from the capability information storage 111, ii) generates the print data specification information including the acquired identification information and the specified print target file name, iii) saves the print data specification information (step S1514), iv) makes the operation panel part 117 display the print condition setting screen (step S1515), and v) monitors whether or not the user has inputted a setting in the print condition setting screen (step S1516).

In the step S1516, i) if a setting has been inputted (step S1516: Y), the central controller 119 saves the input print setting information (step S1517), and ii) if the setting has not been inputted, the central controller 119 saves the default print setting information (step S1518).

Next, after the user has inputted a print execution instruction via the operation panel part 117 (step S1519), the central controller 119 outputs to the print command generator 118 the saved input or default print setting information.

Having received the above input, the print command generator 118 converts the description language of the input or default print setting information into PJL commands (step S1520), generating the second PJL description print setting information, and outputs it to the central controller 119.

Then the central controller 119 generates the second print instruction information including the second PJL description print setting information inputted from the print command generator 118 and the saved print data specification information, and transmits the generated second print instruction information to the server 104 via the communication controller 110 (step S1521).

(Print Control Process)

Figure 12:
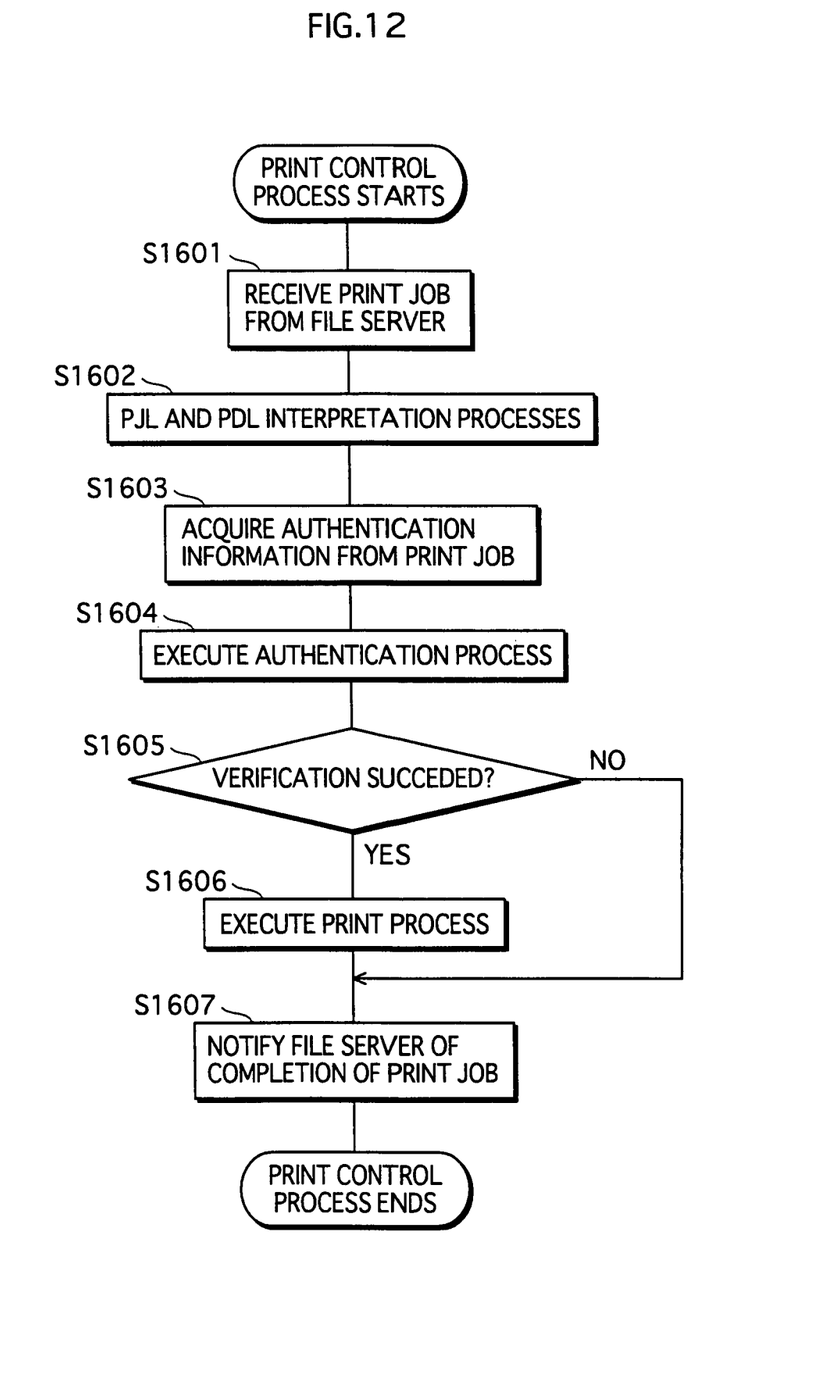
FIG. 12 is a flowchart showing a print controlling process performed by the image forming apparatus 101.

In the following, a description will be made on the operation of the print control process by the image forming apparatus 101. FIG. 12 is a flowchart showing a print controlling process performed by the image forming apparatus 101.

Below is a description on the above-mentioned operation with reference to FIG. 12. Note that the image forming apparatuses 102 and 103 operate in a similar way to the image forming apparatus 101.

The central controller 119 receives the print job transmitted from the server 104 via the communication controller 110 (step S1601) and outputs the received print job to the print device 120.

The print device 120 interprets the PDL description print data in the print job inputted from the central controller 119 at the PDL interpreter 1211 and interprets the PJL description print management information and the second PJL description print setting information in the print job at the PJL interpreter 1212 (step S1602). Then the print device 120 acquires the user authentication information by decrypting the encrypted user authentication information with use of the encryption key stored in the registration authentication information storage 112 (step S1603) and performs an authentication process at the authentication part 122 (step S1604). In the authentication process, if the verification of the user authentication information against the corresponding registration authentication information succeeds (step S1605: Y), the print device 120 performs a print process at the print controller 123 performs (step S1606) and notifies the central controller 119 of the completion of the print job and the identification number of the completed print job.

Upon receiving the above-mentioned respective notifications from the print device 120, the central controller 119 notifies the server 104 of the identification number of the completed print job via the communication controller 110 (step S1607).

If the verification fails in the step S1605, the print device 120 notifies the central controller 119 of the completion of the print job and the identification number of the completed print job and proceeds to the step S1607.

Upon receiving the above-mentioned completion notification, the server 104 deletes the record of the issued print job.

(Print Job Issuing Process)

Figure 13:
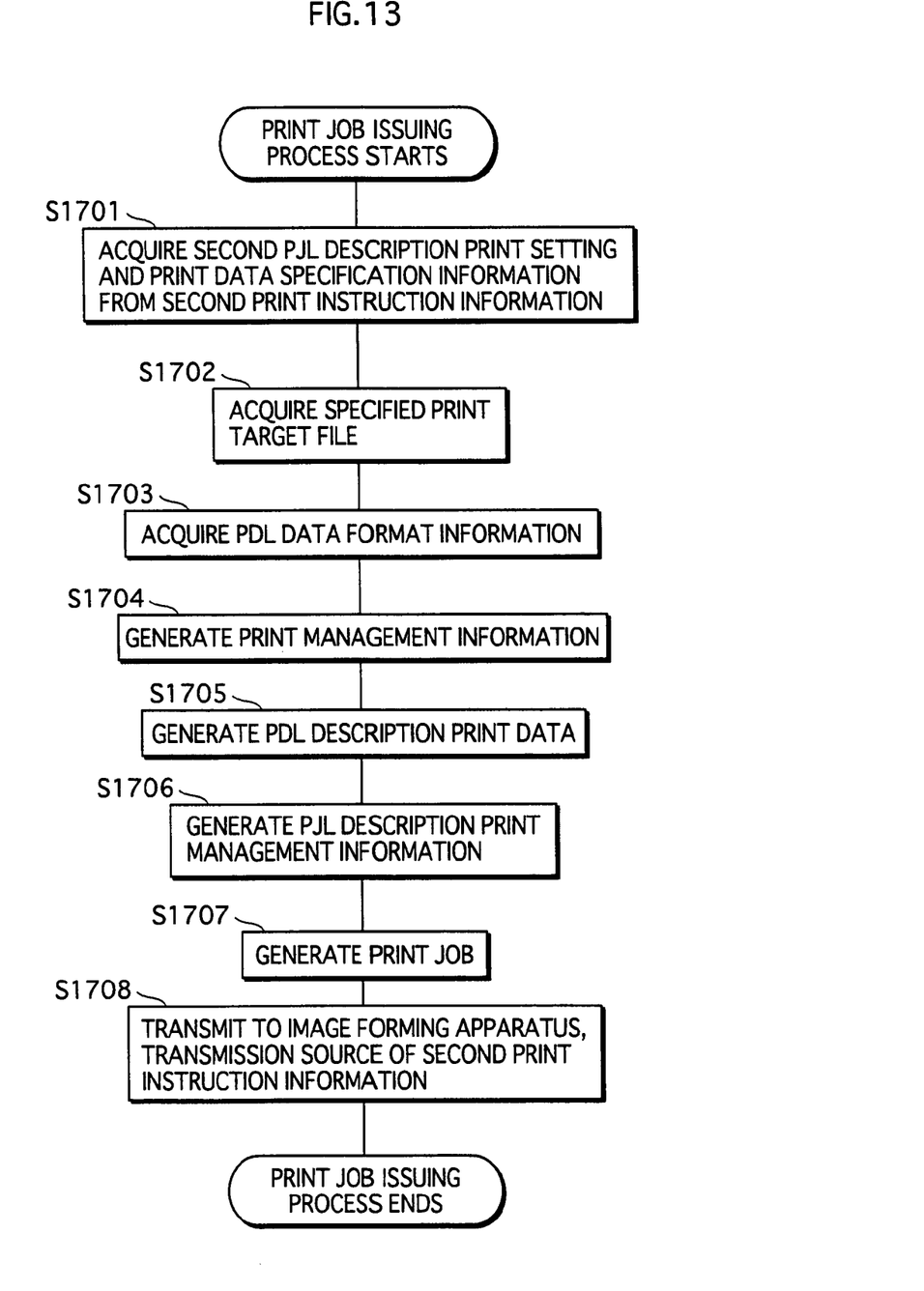
FIG. 13 is a flowchart showing a print job issuing process performed by the server 104.

Described next is an operation of the print job issuing process by the server 104. FIG. 13 is a flowchart showing a print job issuing process performed by the server 104. In the following, the above-mentioned operation is described with reference to FIG. 13.

Having received the second print instruction information transmitted from the image forming apparatus (here, image forming apparatus 101) connected to the LAN 105, the controller 144 i) acquires the second PJL description print setting information and the print data specification information from the second print instruction information (step S1701), ii) acquires, from the print file storage 143, the print target file corresponding to the print target file name indicated by the print data specification information (step S1702), and iii) acquires, from the apparatus information storage 142, the PDL data format information of the image forming apparatus (here, image forming apparatus 101) specified by the identification information of the image forming apparatus indicated by the print data specification information (step S1703).

After that, the controller 144 i) generates the identification number of the print job and the print management information including the generated identification number of the print job and the identification information of the image forming apparatus indicated by the print data specification information (step S1704) and ii) outputs to the print job generator 141 the second PJL description print setting information acquired from the second print specification information, the print target file acquired from the print file storage 143, the PDL data format information acquired from the apparatus information storage 142, and the generated print management information.

Following the above process, the print job generator 141 i) generates the PDL description print data by converting the data format of the inputted print target file with use of the printer driver corresponding to the data format indicated by the PDL data format information (step S1705), ii) generates the PJL description print management information by converting the description language of the inputted print management information (step S1706), iii) generates the print job from the generated PDL description print data and PJL description print management information, and the inputted second PJL description print setting information (step S1707), and iv) outputs to the controller 144.

The controller 144 first specifies the network address of the image forming apparatus, the transmission source of the second print instruction information, based on the identification information of the image forming apparatus indicated by the second print instruction information and the information regarding the network address of the image forming apparatus stored in the apparatus information storage 142. Next, the controller 144 transmits the inputted print job to the specified network address of the image forming apparatus (here, image forming apparatus 101), the transmitting source of the second print instruction information, via the communication controller 140 (step S1708).

(Summary of Overall Print Process of Push-Type Pull Printing System 100)

Figure 10:
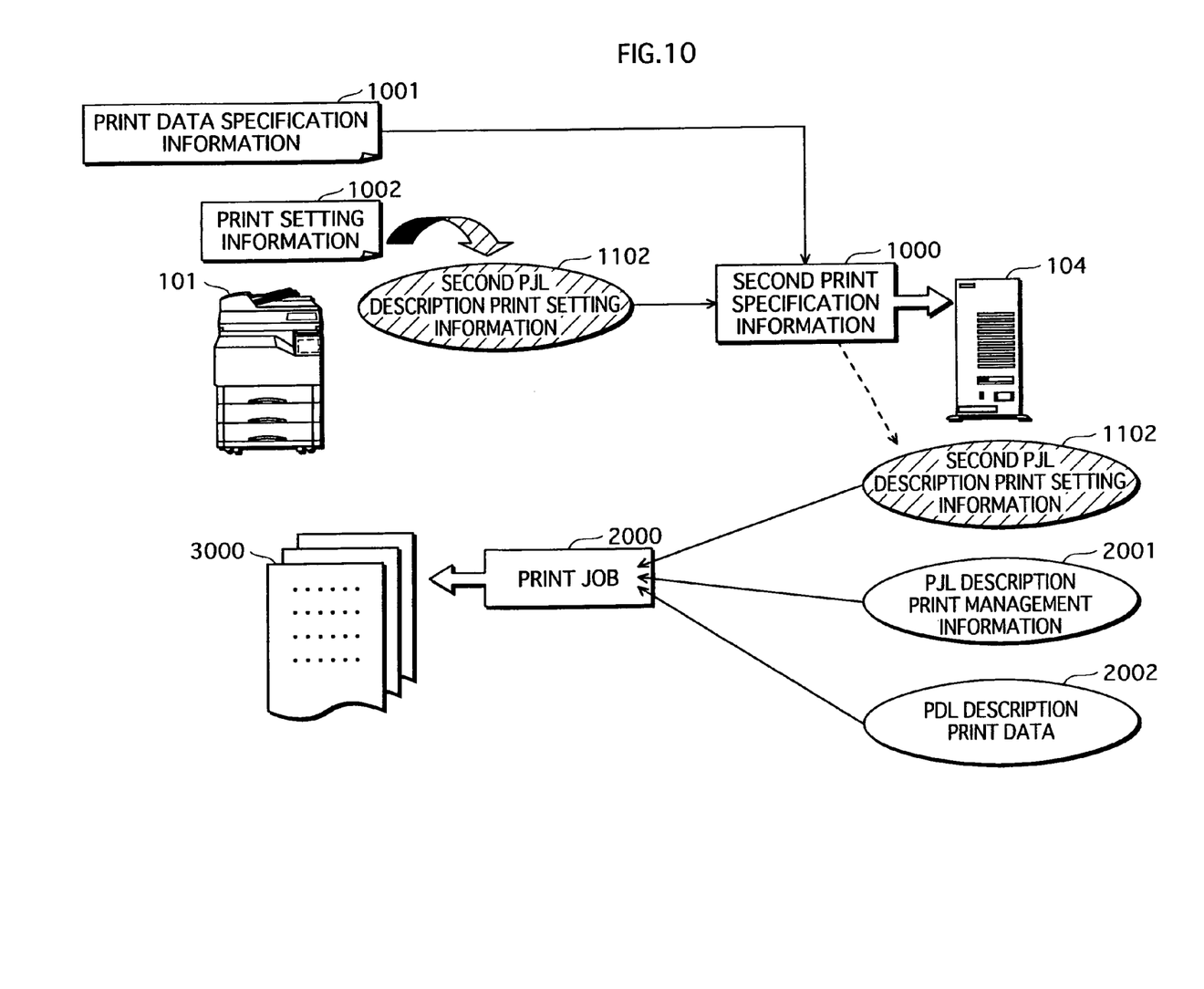
FIG. 10 is an image diagram showing an overall process of a print process performed in the push-type pull printing system 100.

FIG. 10 is an image diagram showing an overall process of a print process performed in the push-type pull printing system 100.

In FIG. 10, each reference numeral indicates the following. 101: the image forming device 101, 104: the server 104, 1000: the second print instruction information, 1001: the print data specification information, 1002: the print setting information before being converted to the PJL commands, 1102: the second PJL description print setting information after being converted into the PJL commands, 2000: the print job, 2001: the PJL description print management information, 2002: the PDL description print data, and 3000: the print process.

As shown in FIG. 10, in the push-type pull printing system 100, the print setting information 1002 (input or default print setting information) is set in the print condition setting screen displayed on the display part 1171 during the generation process of the second print instruction information in FIG. 11. And, before being transmitted to the server 104, the description language of the above-mentioned print setting information 1002 is converted, by the image forming apparatus side, to PJL commands interpretable by the print device 120, and following that, the print setting information 1002 is transmitted to the server 104 as the second PJL description print setting information 1102.

Then, unlike in the conventional push-type pull printing system in FIG. 14 where the server 60 converts the description language of the print setting information 502 transmitted from the image forming apparatus 50 to PJL commands, the server 104 generates the print job 2000 including the transmitted second PJL description print setting information 1102 as it is. The print job 2000 is then transmitted to the image forming apparatus 101 which subsequently executes the print process 3000.

As a result of the above processes, the server side does not need to perform processes to convert the description language of the print setting information into the PJL commands which are interpretable by the print device. Accordingly, even in a case where an image forming apparatus using PJL commands uniquely created by a manufacturer is newly added to the push-type pull printing system 100, it is not necessary to newly register those uniquely-created PJL commands every time to make the PJL commands correspond with the print setting information. Consequently, this allows an easy maintenance of the print job issuing function at the server side, and enhances smooth execution of print processes even when a setting is made on a print condition corresponding to the uniquely-set PJL commands.

<Supplementary>

Up to now, the push-type pull printing system 100 in accordance with the present invention has been described based on the embodiment. However, it is obvious that the present invention is not limited to the present embodiment.

(1) While a number of servers included in the push-type pull printing system 100 is one in the present embodiment, the number of servers is not limited to one, and can be multiple. Also, the push-type pull printing system 100 is applicable as long as there is at least one image forming apparatus included therein.

(2) While the data format of the print target file stored in the print file storage 143 is converted into a PDL data format in the present embodiment, the data format of the print target file stored in the print file storage can be a PDL data format. In this case, if the PDL data format corresponds with the PDL data format interpretable by the image forming apparatus to which the print job is transmitted, the stored print target file can be issued as the print job without performing a conversion process of the print data format.

Also, each image forming apparatus included in the push-type pull printing system 100 can have a PDL interpreter therein which can interpret a common PDL data format. This way, by uniformly using the common PDL data format which is interpretable by the above-mentioned PDL interpreter for the print target files stored in the print file storage 143, the conversion process of the print data files can be omitted.

Additionally, the data format of the print target file can be rasterized bitmap data. In this case also, the conversion process of the print data file can be omitted, resulting in the PDL interpreter becoming unnecessary at the image forming apparatus side.

(3) While print target files are stored in the server 104 in the present embodiment, a file server can be provided to manage the print target files. By having the file server connected to the LAN 105, the server 104 can acquire the print target files therefrom when issuing a print job. Specifically, among components of the server 104, functions of the print file controller 1444 and the print file storage 143 can be performed by the additionally provided file server.

(4) While a number of the print target files specified by the second print instruction information is one in the present embodiment, more than one print target files can be specified.

In this case, setting of the print condition can be either performed separately for each print target file or performed collectively for all the specified print target files by setting a common print condition.

In the above case, a print job corresponding to the print process of each print target file can be issued by the server 104 by having the central controller 119 prepare a set of data including print data specification information, input or default print setting information, and second print instruction information for each specified print target file and transmit these information to the server 104.

What is claimed is:

1. A push-type pull printing system comprising a server and an image forming apparatus, the server sending, to the image forming apparatus, a print job including print data and a print condition instruction command for the print data, and the image forming apparatus executing a print process based on the print job, the image forming apparatus comprising:
an input receiver operable to receive an input of a print condition for a file;
a converter operable to convert the inputted print condition, before being transmitted to the server, to the print condition instruction command whose description language is interpretable by the image forming apparatus; and
a transmitter operable to transmit the converted print condition instruction command to the server, and the server comprising:
a receiver operable to receive, from the image forming apparatus, the converted print condition instruction command,
a print job generator operable to generate the print job including print data for the file and the received converted print condition instruction command, and a job transmitter operable to send, to the image forming apparatus, the print job including therein the received converted print condition instruction command as the print condition instruction command,
wherein the image forming apparatus receives the print job and executes print process for the print data based on the received converted print condition instruction command included in the print job.

2. The push-type pull printing system of claim 1, wherein the inputted print condition includes user authentication information,
the user authentication information is encrypted before being converted to the print condition instruction command and transmitted to the server, and
the image forming apparatus further comprises:
a decrypter operable to acquire the encrypted user authentication information by interpreting the print job and decrypt the acquired encrypted user authentication information;
a verifier operable to perform a verification of the decrypted user authentication information; and
a printer operable to execute the print process if the verification is successful.

3. The push-type pull printing system of claim 2, wherein the converted print condition instruction command is a printer job language (PJL).

4. The push-type pull printing system of claim 1, wherein the converted print condition instruction command is a printer job language (PJL).

5. An image forming apparatus in a push-type pull printing system, executing a print process based on a print job that is sent by a server and includes print data and a print condition instruction command for the print data, the image forming apparatus comprising:
an input receiver operable to receive an input of the print condition for a file;
a converter operable to convert the inputted print condition, before being transmitted to the server, to the print condition instruction command by changing a description language of the inputted print condition to a different description language which is interpretable by the image forming apparatus; and
a transmitter operable to transmit the converted print condition instruction command to the server, and
an executor operable to receive the print job generated by the server which includes print data for the file and the converted print condition instruction command and to execute print process for the print data based on the converted print condition instruction command included in the print job.

6. The image forming apparatus of claim 5, wherein
the inputted print condition includes user authentication information,
the user authentication information is encrypted before being converted to the print condition instruction command and transmitted to the server, and
the image forming apparatus comprises:
a decrypter operable to acquire the encrypted user authentication information by interpreting the print job and decrypt the acquired encrypted user authentication information;
a verifier operable to perform a verification of the decrypted user authentication information; and
a printer operable to execute the print process if the verification is successful.

7. The image forming apparatus of claim 6, wherein the different description language of the converted print condition instruction command is a printer job language (PJL).

8. The image forming apparatus of claim 5, wherein the different description language of the converted print condition instruction command is a printer job language (PJL).

9. A pull printing method used in a push-type pull printing system comprising a server and an image forming apparatus, the server sending, to the image forming apparatus, a print job including print data and a print condition instruction command for the print data, and the image forming apparatus executing a print process based on the print job, the pull printing method comprising the steps of:
causing the image forming apparatus to i) receive an input of the print condition for a file, ii) convert the inputted print condition, before being transmitted to the server, to the print condition instruction command by changing a description language of the inputted print condition to a different description language which is interpretable by the image forming apparatus, and iii) transmit the converted print condition instruction command to the server; and
causing the server to i) receive, from the image forming apparatus, the converted print condition instruction command, to ii) generate the print job including print data for the file and the received converted print condition instruction command, and to iii) send, to the image forming apparatus, the print job including therein the received converted print condition instruction command as the print condition instruction command, and causing the image forming apparatus to i) receive the print job and to ii) execute print process for the print data based on the received converted print condition instruction command included in the print job.

10. The pull printing method of claim 9, wherein the inputted print condition includes user authentication information, and the user authentication information is encrypted before being converted to the print condition instruction command and transmitted to the server, and the pull printing method further comprising the step of:

causing the image forming apparatus to i) acquire the encrypted user authentication information by interpreting the print job and decrypt the acquired encrypted user authentication information, ii) perform a verification of the decrypted user authentication information, and iii) execute the print process if the verification is successful.

11. The pull printing method of claim 10, wherein the different description language of the converted print condition instruction command is a printer job language (PJL).

12. The pull printing method of claim 9, wherein the different description language of the converted print condition instruction command is a printer job language (PJL).

\* \* \* \* \*